United States Patent
Toms

(10) Patent No.: US 9,481,383 B2
(45) Date of Patent: Nov. 1, 2016

(54) ELECTRONIC CONDITION DETECTION SYSTEM AND METHOD FOR RAILCARS

(71) Applicant: Union Tank Car Company, Chicago, IL (US)

(72) Inventor: Robert S. Toms, Chicago, IL (US)

(73) Assignee: Union Tank Car Company, Chicago, IL (US)

(*) Notice: Subject to any disclaimer, the term of this patent is extended or adjusted under 35 U.S.C. 154(b) by 0 days.

(21) Appl. No.: 14/936,329

(22) Filed: Nov. 9, 2015

(65) Prior Publication Data

US 2016/0096536 A1 Apr. 7, 2016

Related U.S. Application Data

(63) Continuation of application No. 14/663,097, filed on Mar. 19, 2015, now Pat. No. 9,182,313, which is a continuation of application No. 13/600,053, filed on Aug. 30, 2012, now Pat. No. 8,985,525, which is a continuation of application No. 12/705,028, filed on Feb. 12, 2010, now Pat. No. 8,258,414.

(60) Provisional application No. 61/152,082, filed on Feb. 12, 2009.

(51) Int. Cl.

| | |
|---|---|
| *B61L 15/00* | (2006.01) |
| *G01G 19/04* | (2006.01) |
| *G01G 23/37* | (2006.01) |
| *G01J 5/00* | (2006.01) |
| *G01K 13/00* | (2006.01) |
| *G01M 3/02* | (2006.01) |
| *G01P 15/00* | (2006.01) |
| *B61D 5/00* | (2006.01) |
| *B61K 9/02* | (2006.01) |
| *B61L 25/02* | (2006.01) |

(Continued)

(52) U.S. Cl.
CPC ............ *B61L 15/0027* (2013.01); *B61D 5/00* (2013.01); *B61K 9/02* (2013.01); *B61L 25/025* (2013.01); *G01C 9/00* (2013.01); *G01G 19/042* (2013.01); *G01G 23/3735* (2013.01); *G01G 23/3742* (2013.01); *G01J 5/00* (2013.01); *G01K 13/00* (2013.01); *G01M 3/02* (2013.01); *G01P 15/00* (2013.01); *G01V 9/00* (2013.01); *B61L 2205/00* (2013.01)

(58) Field of Classification Search
CPC .......... B61L 15/0081; B61L 15/0027; G01G 19/042; G01G 23/3735; G01G 27/3742
USPC ..... 246/169 A, 169 D, 169 S, 187 A, 187 B, 246/187 C
See application file for complete search history.

(56) References Cited

U.S. PATENT DOCUMENTS

| | | | | | |
|---|---|---|---|---|---|
| 5,438,322 | A | * | 8/1995 | Martin | ................... F16C 19/525 246/169 A |
| 5,446,452 | A | * | 8/1995 | Litton | ...................... B61K 9/04 246/159 |

(Continued)

*Primary Examiner* — Jason C Smith
(74) *Attorney, Agent, or Firm* — Banner & Witcoff, Ltd.

(57) ABSTRACT

A railcar has an on-board system for weighing a load of the railcar. A center plate load cell is attached to the bottom of the railcar body and supports the first end of the railcar body on a truck assembly via the center bowl of the truck assembly. A pair of side bearing load cells are mounted to the bottom of the railcar body so as to flank the center plate load cell. A pair of side bearings are positioned on the top surface of the truck assembly bolster in alignment with the pair of side bearing load cells. Circuitry sums signals from the center plate load cell and the pair of side bearing load cells to provide a summed output corresponding to a weight of the railcar load. The summed output is conditioned and transmitted via a satellite and/or cable system to a remote receiving station.

20 Claims, 8 Drawing Sheets

(51) Int. Cl.
*G01C 9/00* (2006.01)
*G01V 9/00* (2006.01)

(56) References Cited

U.S. PATENT DOCUMENTS

| | | | | |
|---|---|---|---|---|
| 6,902,082 B2* | 6/2005 | Mabry | ............... | B01D 3/10 |
| | | | | 105/377.07 |
| 6,952,996 B2* | 10/2005 | Sisk | ............... | B65D 90/10 |
| | | | | 105/282.2 |
| 7,705,743 B2* | 4/2010 | Barone | ............... | B61L 15/0027 |
| | | | | 246/169 A |
| 8,555,555 B2* | 10/2013 | Cardwell | ............... | E02D 29/12 |
| | | | | 105/377.06 |
| 8,672,273 B2* | 3/2014 | Brown | ............... | B61L 15/0027 |
| | | | | 246/169 A |
| 2004/0104310 A1* | 6/2004 | Demuth | ............... | B61L 15/0081 |
| | | | | 246/122 R |
| 2007/0152107 A1* | 7/2007 | LeFebvre | ............... | B61K 9/00 |
| | | | | 246/169 R |
| 2008/0128563 A1* | 6/2008 | Kumar | ............... | B61L 3/127 |
| | | | | 246/187 A |
| 2008/0145170 A1* | 6/2008 | Lisenby | ............... | B61D 3/16 |
| | | | | 410/49 |
| 2012/0181390 A1* | 7/2012 | Ashraf | ............... | B61L 29/28 |
| | | | | 246/122 R |
| 2013/0270396 A1* | 10/2013 | Agostini | ............... | B61K 9/06 |
| | | | | 246/169 A |

* cited by examiner

ELECTRONIC CONDITION DETECTION SYSTEM AND METHOD FOR RAILCARS

CLAIM OF PRIORITY

This application is a continuation of U.S. application Ser. No. 14/663,097, filed Mar. 19, 2015, which is a continuation of U.S. application Ser. No. 13/600,053, filed Aug. 30, 2012 (U.S. Pat. No. 8,985,525, issued Mar. 24, 2015), which is a continuation of U.S. application Ser. No. 12/705,028, filed Feb. 12, 2010 (U.S. Pat. No. 8,258,414, issued Sep. 4, 2012), which claims priority from U.S. Provisional Patent Application Ser. No. 61/152,082, filed Feb. 12, 2009.

FIELD OF THE INVENTION

The present invention relates to railcars and, more particularly, to a system for measuring the weight of railcar loads.

BACKGROUND

Transporting commodities by common rail carrier is one of the most economical and efficient means to move commodities to destination points across North America. Most railcars transport a certain volume or weight of commodity which determines the commercial value of materials being shipped. Most railcars are loaded to capacity of the railcar by either volume or weight. In either case, the weight of the commodity is essential to determine the value of commodity being transported.

There are several prior art devices that can detect and communicate to a user if a railcar is either empty or loaded. These devices are basically position devices that determine the compression of a railcar truck suspension spring. Such a device indicates whether the suspension spring is fully compressed (loaded car) or fully relaxed (empty car). This method does not measure the specific weight of the railcar, but rather the status: either empty or loaded. Furthermore, such devices are not suitable for transmission of the load information to a remote location.

Prior art weighing devices also are typically unable to withstand the rigors of the railcar environment. Therefore, in today's shipping world, railcar weight is commonly measured at origin and destination points with in-rail track scales. This process is slow and susceptible to false weight measurement.

Weighing devices that use load cells that are on-board railcars are known. For example, U.S. Pat. No. 6,441,324 to Stimpson discloses a weighing system for railroad cars where a load cell is designed to fit on the bottom of the railcar center plate and fit into the railcar truck center bowl. The output of the load cell is provided to a telemetry transmitter, which transmits an indication of weight to a user. While the vast majority of a railcar weight is located above and through the center plate, all railcars experience some sideways rock and roll due to rail track curvature, banking and other irregularities. As a result, the railcar rocks, or pivots, on the center plate. The amount of rock and roll a railcar exhibits is controlled by the side bearings. Under most conditions, moving or stationary, a railcar will be leaning to one side and on one of these side bearings. This causes a weighing system based solely on the center plate, as is the case for the '324 patent, to be inaccurate on many occasions.

A need therefore exists for a weighing system that is accurate, durable and that may transmit data to a remote location.

DETAILED DESCRIPTION OF EMBODIMENTS

Figure 1:
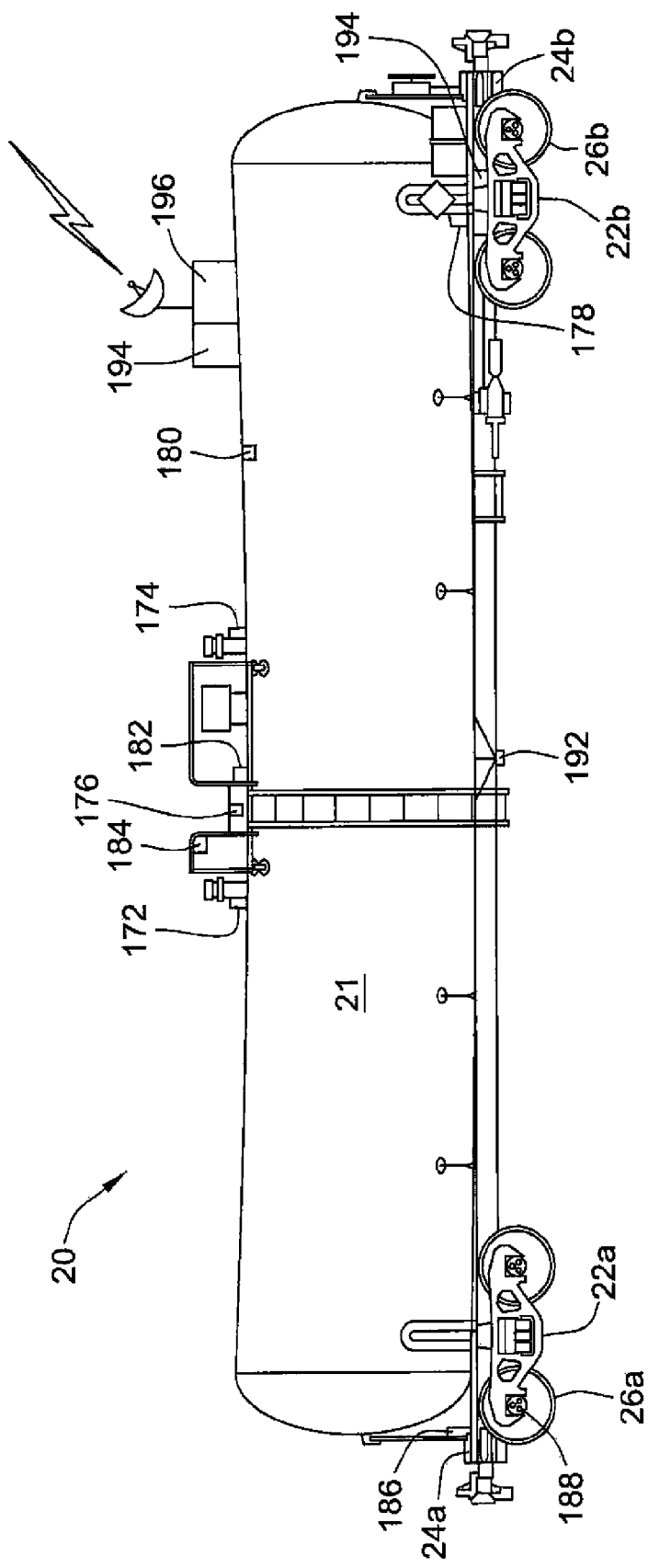
FIG. 1 is a side elevation view of a tank car equipped with an embodiment of the system of the present invention.

A tank car equipped with load cells, transducers and sensors in an embodiment of the system and method of the invention is indicated in general at 20 in FIG. 1. While a tank car is illustrated, alternative types of railcars may be employed with the system and method of the present invention as well. As is well known in the art, the tank car features a tank 21 that is supported upon front and rear truck assemblies 22a and 22b by front and rear body bolsters 24A and 24b, respectively. The tank car wheels 26a and 26b are mounted to the front and rear truck assemblies 24a and 24b. As an alternative to the individual separate body bolsters of FIG. 1, the railcar could feature a full underframe including integrated body bolsters. The tank, or other storage unit, and the supporting body bolsters or similar structure, make up the body of the railcar.

Figure 2:
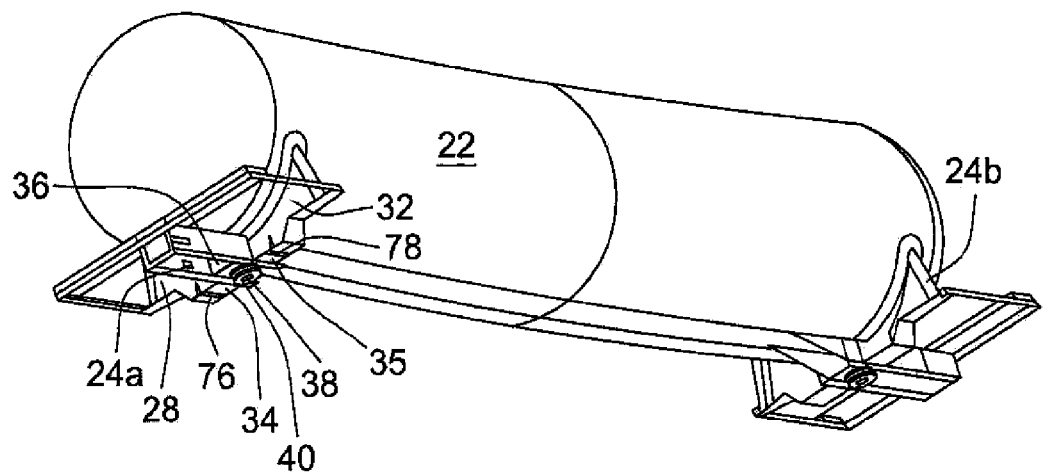
FIG. 2 is a bottom perspective view of the body bolsters and tank of the tank car of FIG. 1.

As illustrated in FIG. 2, the body bolsters 24A features a pair of bolster webs 28 and 32 to which bottom flanges 34 and 35 are attached. The bolster webs flank the draft sill 36, which serves as a housing for the railcar coupler. A center plate 38 is attached to the bottom surface of the draft sill, typically by bolts. The center plate features a central opening 40.

Figure 3:
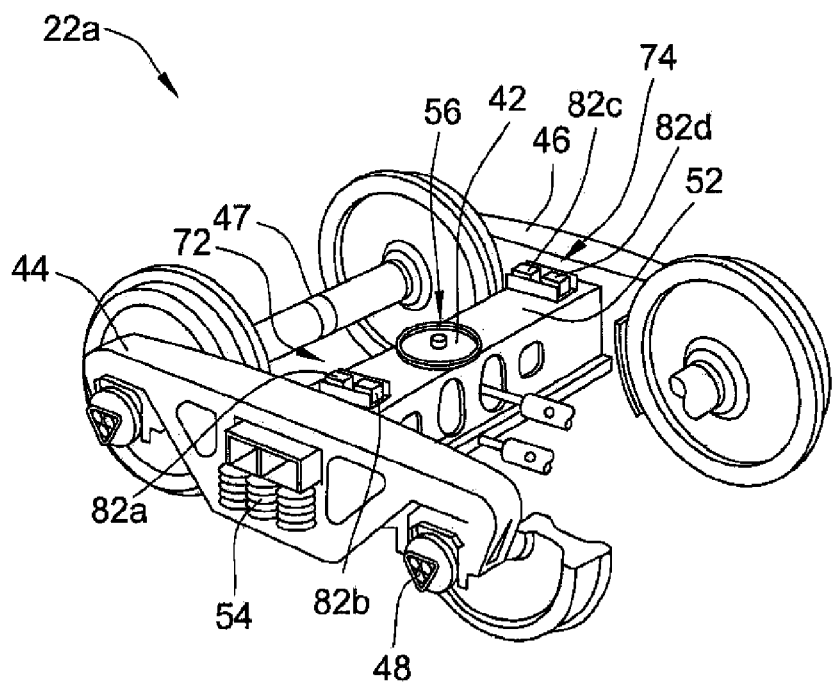
FIG. 3 is an enlarged top perspective view of one of the truck assemblies of the tank car of FIG. 1.

An enlarged view of the truck assembly 22a of the tank car of FIG. 1 is provided in FIG. 3. As illustrated in FIG. 3, the truck assembly features a pair of side frames 44 and 46 which support the railcar wheels and axles (47) via bearings 48. The side frames are mounted to opposite ends of a truck assembly bolster 52 via springs 54. A center bowl 42 is positioned in the center of the top surface of the bolster 52. A center pin 56 projects upwards from the center of the center bowl. Truck assembly 22b (FIG. 1) features a similar construction.

Figure 4:
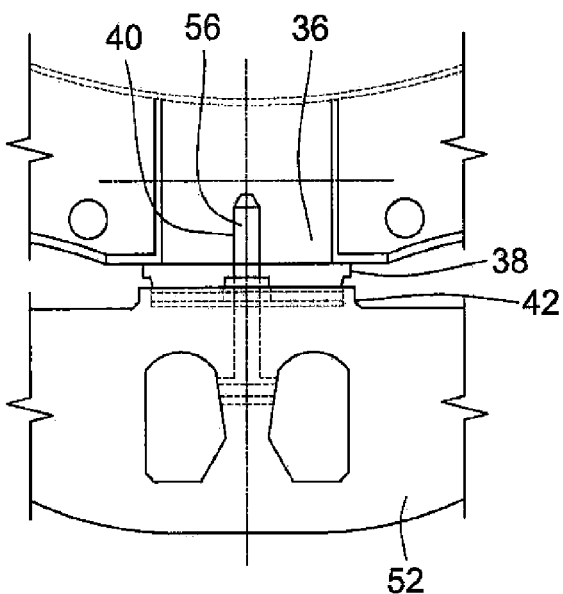
FIG. 4 is an end elevation view of central portions of one of the body bolsters of FIG. 2 and the truck assembly of FIG. 3 illustrating the connection between the center plate of the body bolster and the center bowl of the truck assembly.

As illustrated in FIG. 4, the center plate 38 of FIG. 2 fits into and rotates within the center bowl 42 of FIG. 3 of the truck assembly. The central opening 40 of the center plate receives the center pin 56 of the truck assembly. The center plate thus is the component of the rail car that provides positioning of the railcar truck assembly and allows rotation of the truck assemblies while the railcar negotiates rail track curvature.

Figure 5:
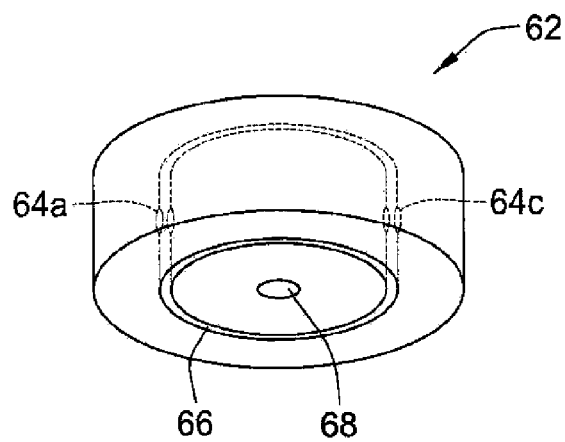
FIG. 5 is a perspective view of a center plate load cell in an embodiment of the system of the present invention.
Figure 6:
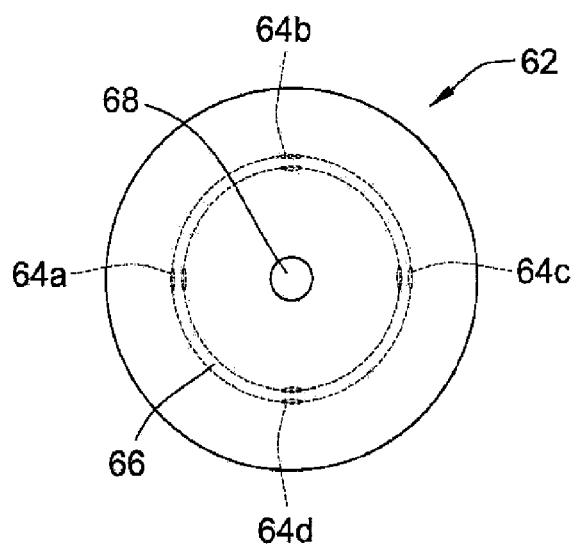
FIG. 6 is a bottom plan view of the center plate load cell of FIG. 5.

In accordance with an embodiment of the system and method of the present invention, a center plate load transducer is fabricated to replicate the center plate 38 of FIGS. 2 and 4 and replaces it so as to be capable of measuring a component of the weight of the tank car load while functioning as a center plate. An embodiment of the center plate load cell is indicated in general at 62 in FIGS. 5 and 6. As illustrated in FIGS. 5 and 6, the center plate load cell utilizes a series of strain gage pairs 64a-64d positioned in an annular machined groove 66 to measure the strain in the steel material of the load cell. Each strain gage pair includes first and second strain gages that are secured one each to opposing portions of the groove side walls and are electrically connected in series. As explained in greater detail below, the strain gages are wired into a Wheatstone bridge circuit to make the central plate load cell sensitive enough and capable of measuring within a few pounds of the total 286,000 lb. (for example) railcar. The center plate load cell also includes a central opening 68 that receives the center pin 56 (FIG. 3) of the truck assembly.

The central plate load cell therefore features a safe, secure and non-conspicuous mounting location that enables it to withstand the rigors of the railcar environment.

The specific load cell structure illustrated in FIGS. 5 and 6 represents an example only. Other devices or structures may be used as long as they may be mounted between the underside of the body bolster (24a of FIGS. 1 and 2) and the center bowl (42 in FIGS. 3 and 4) of the truck assembly. For example, suitable center plate load cells or transducers include the Model RT load cell available from DJ Instruments of Billerica, Mass. Alternatively, a load cell may be used that attaches to the bottom surface of the existing center plate. Such a load cell is presented in U.S. Pat. No. 6,441, 324 to Stimpson.

In accordance with the present invention, the center plate load cell is supplemented with side bearing load cells to more accurately determine the weight of the tank car load, as will now be explained.

As illustrated in FIG. 3, the truck assembly is also provided with a pair of side bearings, indicated in general at 72 and 74. When the truck assembly and body bolster are assembled, they are in alignment with the corresponding side bearing plates, illustrated at 76 and 78 in FIG. 2, positioned on the bottom flanges 34 and 35 of the bolster webs 28 and 32. The side bearings and corresponding side bearing plates function to control railcar rocking and rolling.

Figure 7:
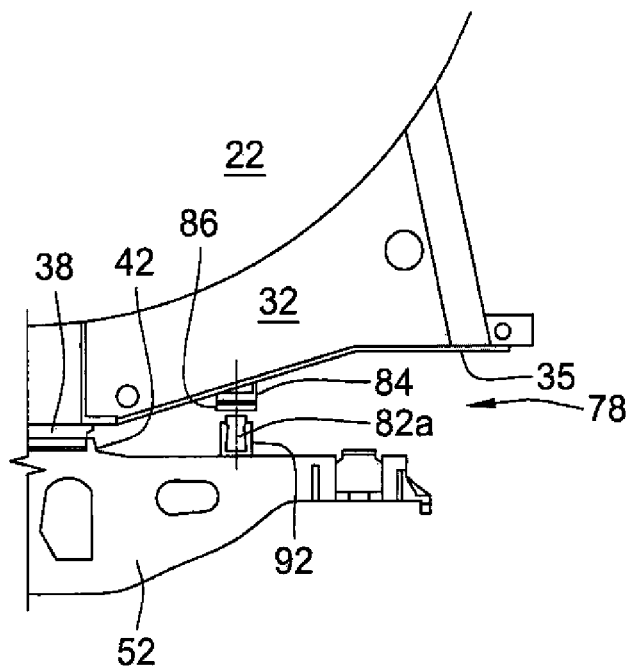
FIG. 7 is a front elevation view of half of a body bolster and half of the truck bolster illustrating double roller style side bearings.
Figure 9:
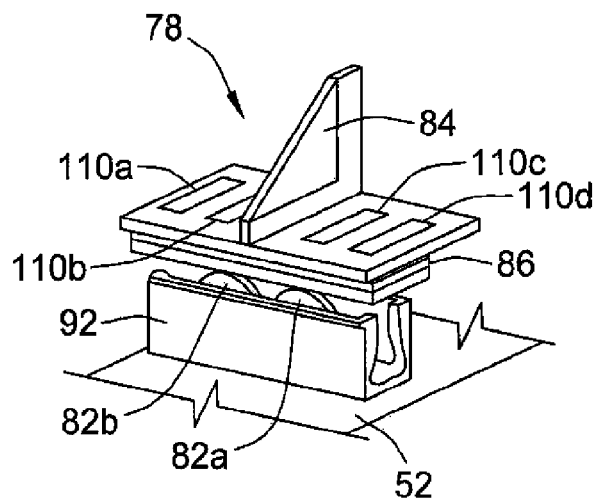
FIG. 9 is an enlarged perspective view showing a side bearing load cell with a double roller style side bearing.

As illustrated in FIGS. 3 and 7, the side bearings 72 and 74 may include double rollers 82a-82d. In such an embodiment, the side bearing plates, indicated in general at 78 in FIGS. 7 and 9, include a side bearing plate bracket 84 and a side bearing plate shim 86 mounted to the bottom surface of the bracket 84. As illustrated in FIG. 9, the rollers 82a and 82b are mounted in a roller cage 92 positioned on the top surface of the truck assembly bolster 52. The remaining side bearings and side bearing plates feature a similar construction.

Figure 8:
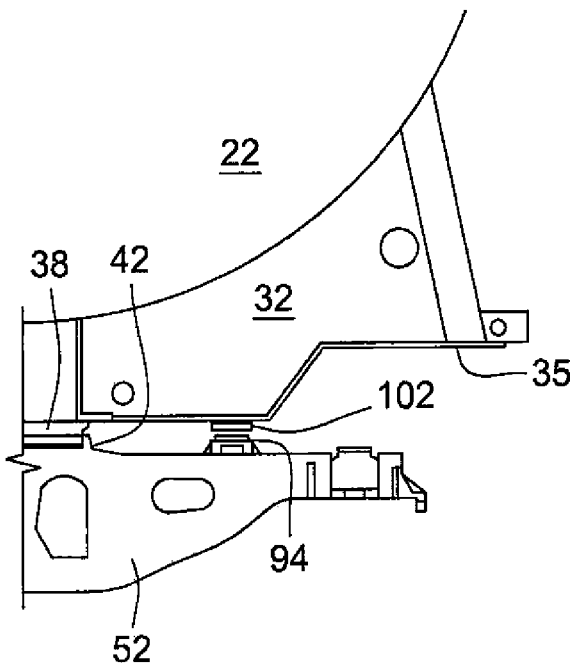
FIG. 8 is a front elevation view of half of a body bolster and half of the truck bolster illustrating fiction block style side bearings.
Figure 10:
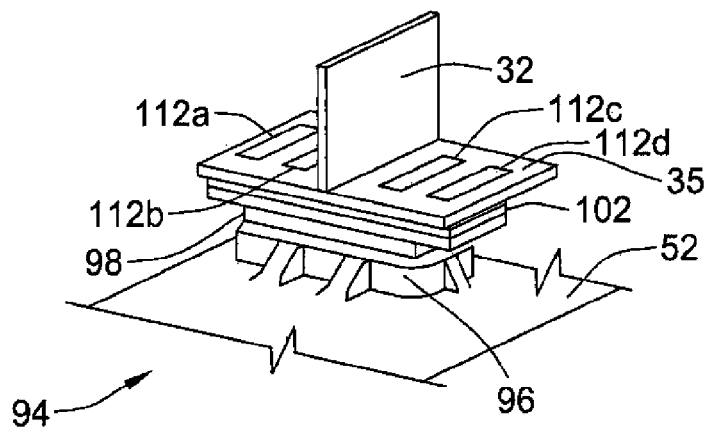
FIG. 10 is an enlarged perspective view showing a side bearing load cell with a friction block style side bearing.

In an alternative embodiment, the side bearings may take the form of a friction pad, indicated at 94 in FIGS. 8 and 10 and positioned on the top surface of the truck assembly bolster 52. As illustrated in FIG. 10, the friction pad may include a base portion 96 and a pad of fiction material 98 positioned on the base portion. As illustrated in FIGS. 8 and 10, the side bearing plates take the form of shims 102 mounted to the underside of the bottom flange 35 of the bolster web 32. The remaining side bearings and side bearing plates feature a similar construction.

Figure 11:
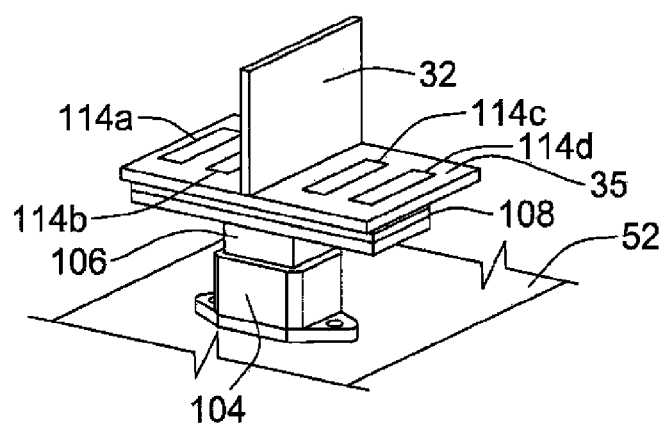
FIG. 11 is an enlarged perspective view showing a side bearing load cell with a constant contact style side bearing.

Another option for the side bearings and side bearing plates is the constant contact style illustrated in FIG. 11. In this embodiment, each side bearing includes a housing 104 positioned on the top surface of the truck assembly bolster 52 that contains a resilient member 106 constructed of rubber or a similar resilient but durable material. The side bearing plates take the form of shims 108 mounted to the underside of the bottom flange 35 of the bolster web 32. The remaining side bearings and side bearing plates feature a similar construction. The constant contact side bearings use the resilient members to keep constant contact with corresponding side bearing plates without requiring a specified gap between them.

As noted previously, the vast majority of a railcar weight is located above and through the center plate. Because of rail track curvature, banking and other irregularities, however, all railcars allow for some sideways rock and roll. In this case, the railcar rocks, or pivots, on the center plate load cell 62. As also noted previously, the amount of rock and roll a railcar exhibits is controlled by the side bearings. Under most conditions, moving or stationary, a railcar will be leaning to one side and on one of these side bearings. Therefore, to measure the true amount of weight, the outputs of the center plate and side bearing load cells must be summed to calculate the total railcar weight. The circuitry of the combined loads cells accounts for the total weight of the railcar load.

As illustrated in FIG. 9, in an embodiment where the side bearings include double rollers, strain gages 110a-d are positioned on the top surface of the each side bearing bracket (84 in FIG. 9). The strain gages measure the strain in the steel material of the side bearing brackets. The strain gages therefore convert the side bearing brackets into side bearing load cells.

A similar approach is used to form the side bearing load cells in FIG. 10. More specifically, as illustrated in FIG. 10, strain gages 112a-d are positioned on the top surface of the bottom flange 35 of the bolster web 32 so as to be positioned over the side bearing plate shims 102. The strain gages measure the strain in the steel material of that portion of the flange. The strain gages therefore convert at least a portion of each bottom flange into a side bearing load cell.

A similar approach is used to form the side bearing load cells in FIG. 11. More specifically, as illustrated in FIG. 11, strain gages 114a-d are positioned on the top surface of the bottom flange 35 of the bolster web 32 so as to be positioned over the side bearing plate shims 108. The strain gages measure the strain in the steel material of that portion of the flange. The strain gages therefore convert at least a portion of each bottom flange into a side bearing load cell.

Alternatively, the strain gages may be positioned on one of more of the shims 86, 102 and 104 of the side bearing plates of FIGS. 9, 10 and 11, respectively, to form the side bearing load cells. As a further alternative to the embodiments of the side bearing load cells illustrated in FIGS. 9-11, the Model PD side bearing load cell from DJ Instruments of Billerica, Mass. may be used.

In a preferred embodiment of the invention, the system includes three load cells (one center load cell and two side bearing load cells) placed at one end of the railcar as described above. Since most all railcars ride on near level tracks, the system needs to only measure the weight at one end of the railcar and double the weight measured by the one end. Placing the load cells and associated components at only one end of the rail car reduces costs, complexity and the chances of damage by approximately one half.

Figure 12:
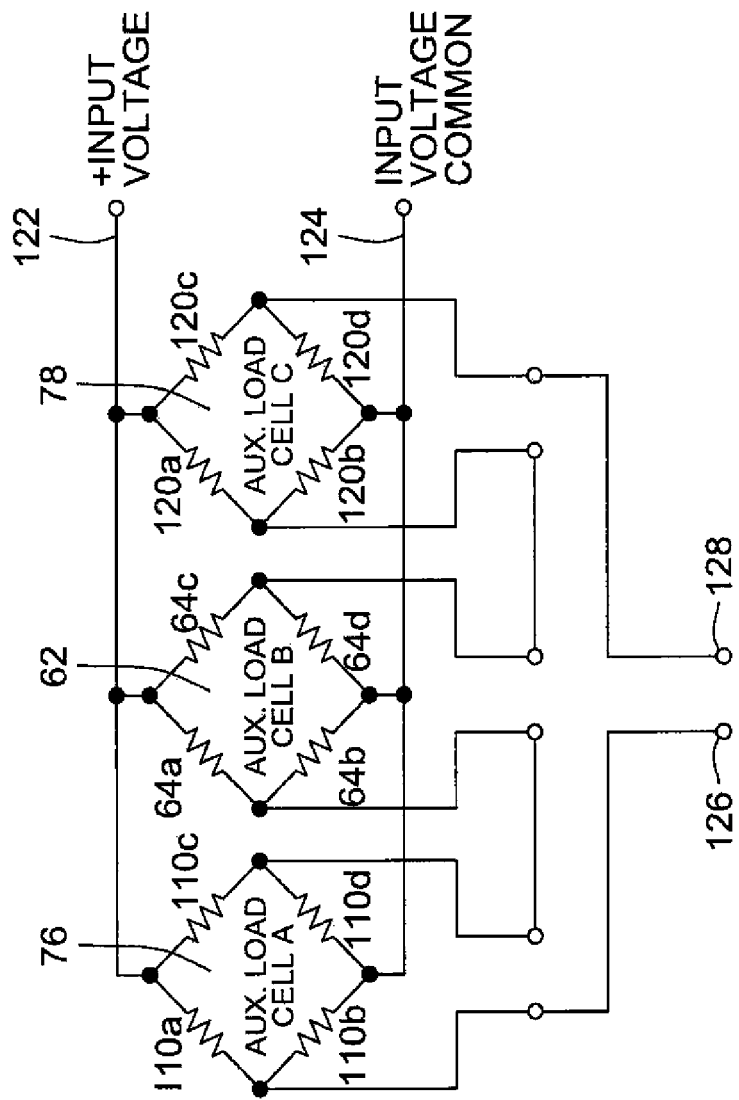
FIG. 12 is a circuit diagram showing the circuitry associated with the center plate load cell and side bearing load cells in an embodiment of the system of the present invention.
Figure 13:
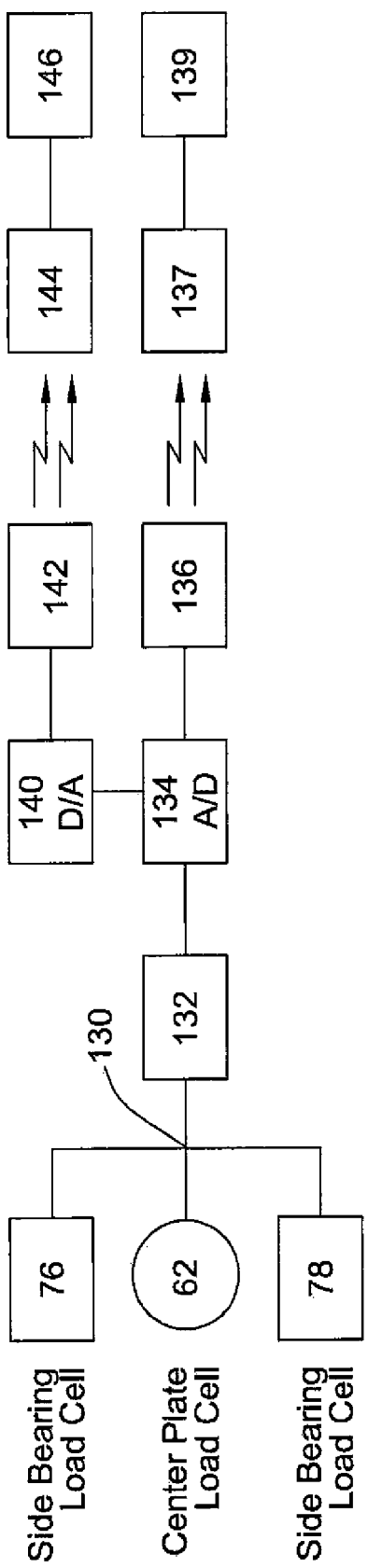
FIG. 13 is a flow chart illustrating processing of summed load cell signals from the circuit of FIG. 12 in accordance with an embodiment of the system and method of the present invention.

A schematic illustrating the center plate load cell 62 and each of the two side bearing load cells 76 and 78 is provided in FIG. 12. A corresponding signal processing flow chart is illustrated in FIG. 13. While FIGS. 12 and 13 address the embodiment of FIGS. 2-7 and 9, where the side bearings include double rollers, it is to be understood that alternative embodiments, such as those including the side bearings of FIGS. 10 and 11, and others, would feature a similar operation.

In the schematic of FIG. 12 and flow chart of FIG. 13, the side load bearing plate 76 of FIG. 2 features the same construction as illustrated for side load bearing plate 78 of FIGS. 7 and 9 and is equipped with strain gages 120a-120d (FIG. 12). As described above, the side load bearing plate 76 of FIG. 2 is aligned with the double roller side load bearing 74 of FIG. 3.

As noted with reference to FIGS. 5 and 6, each of the strain gage pairs 64a-64d of the center plate load cell 62 features first and second strain gages that are connected in series. As a result, resistor 64a in FIG. 12 actually represents two strain gages connected in series. The same applies for resistors 64b, 64c and 64d in FIG. 12. The remaining resistors illustrated in FIG. 12 (110a-11d and 120a-120d) each correspond to a single strain gage of the side bearing load cells.

As illustrated in FIG. 12, the strain gages of each load cell are connected in the form of a Wheatstone bridge circuit with the Wheatstone bridge circuits connected in parallel. The entire circuit is subject to an excitation voltage applied across positive and negative terminals 122 and 124. The excitation voltage preferably comes from a battery mounted near the center plate load cell having a minimum voltage of 5 volts. Higher voltages are preferable, however, since the output of the circuit of FIG. 12 is proportional to the input voltage. As an example only, resistors 110a-110d and resistors 120a-120b may each have a resistance of 2000 ohms. Resistors 64a-64d may each have a resistance of 4000 ohms.

Each load cell is calibrated so that no unbalance in all of the Wheatstone bridge circuits of FIG. 12 corresponds to an unloaded condition for the tank car. In other words, when the tank car is unloaded, current flow through resistors 110a and 110c is the same as current flow through resistors 110b and 110d, current flow through resistors 64a and 64c is the same as current flow through resistors 64b and 64d and current flow through resistors 120a and 120c is the same as current flow through resistors 120b and 120d. This results in no signal at output terminals 126 and 128. When each load cell is loaded, the resistances of the load cell's strain gages are altered due to strain in the load cell material (preferably steel) so that the corresponding Wheatstone bridge provides an analog signal. The load cells are calibrated so that, when the individual load cell signals are summed, they provide an output signal that corresponds to the weight of the tank car load. The summed output signal is provided at output terminals 126 and 128. When the tank car is in a non-tilting orientation, and all of the load is concentrated on the center plate load cell 62, the total output from terminals 126 and 128 will equal the output signal from the center plate load cell only (since the side bearing load cells are unloaded and thus produce no output signal). If the tank car is tilting, one of the side bearing load cells is loaded, and thus produces a corresponding signal. This signal is in added to the signal produced by the center plate load cell, which is also carrying some of the load, and the result is provided as a signal corresponding to the weight of the tank car load at output terminals 126 and 128.

In FIG. 13, the summed output signal of the load cells from output terminals 126 and 128 is represented as summing junction 130. The summed output signal is provided to a signal conditioner 132. Signal conditioner 132, which may be a microprocessor, CPU, or any suitable electronic device known in the art, amplifies the summed signal from the load cells generally filters the signal, removing high frequency noise, EMF interference, radio interference and the like as is known in the art. After being conditioned, the signal is applied to an analog-to-digital converter 134 which converts the summed analog output to a digital signal of sufficient resolution to indicate the weight of the tank car load. The digital signal may then be converted into telemetry by a transceiver 136 and transmitted to a receiver 137 for display on a digital indicator 139 which may be, for example, a computer display or workstation or the like. In addition, or alternatively, after the analog-to-digital converter, a digital-to-analog converter 140 may be used to provide an analog signal indicative of weight. This analog signal is converted to telemetry by a transceiver 142 and transmitted to a receiver 144 for viewing at analog display 146 which may be, for example, a computer display or workstation or the like. The conditioner, converter and transceiver components of FIG. 3 should be attached to the tank car body bolster, on top of the tank, or in another secure location. Options for communicating data from the load cells to the conditioner and other components and for transmitting the telemetry will be described below.

In an alternative embodiment, each load cell may have its own dedicated battery with the outputs still summed as illustrated in FIGS. 12 and 13 and described above. Alternatively each load cell may feature a transmitter that transmits the output for each individual load cell to a central processing unit (such as conditioner 194 of FIG. 1, described below) that sums and conditions the signals as illustrated in FIGS. 12 and 13 and described above.

The present invention therefore recognizes that while railcars are simple in design, they offer little in terms of protected areas to mount equipment. Furthermore, some major components, such as truck assemblies, are regularly removed, repaired and replaced. Most times they are replaced with different, remanufactured assemblies. Therefore, mounting any telemetry system components to the truck assembly, such as the load cells of the invention, is prohibitive. According to the embodiment of the present invention described above, the main body (non-truck or other removable railcar structures) is the preferred mounting location for load cells, transducers or sensors and related components. In other words, such devices are mounted on-board of the body of the railcar itself.

An embodiment of the system for transmitting and receiving the data collected by weighing system described above is provided in FIG. 14. It should be noted that the term "remote" as used herein means any location that is not on-board the tank car. Such a location may be next to the tank car, such as in a rail yard, or a location that is cross country with respect to the location of the tank car.

Figure 14:
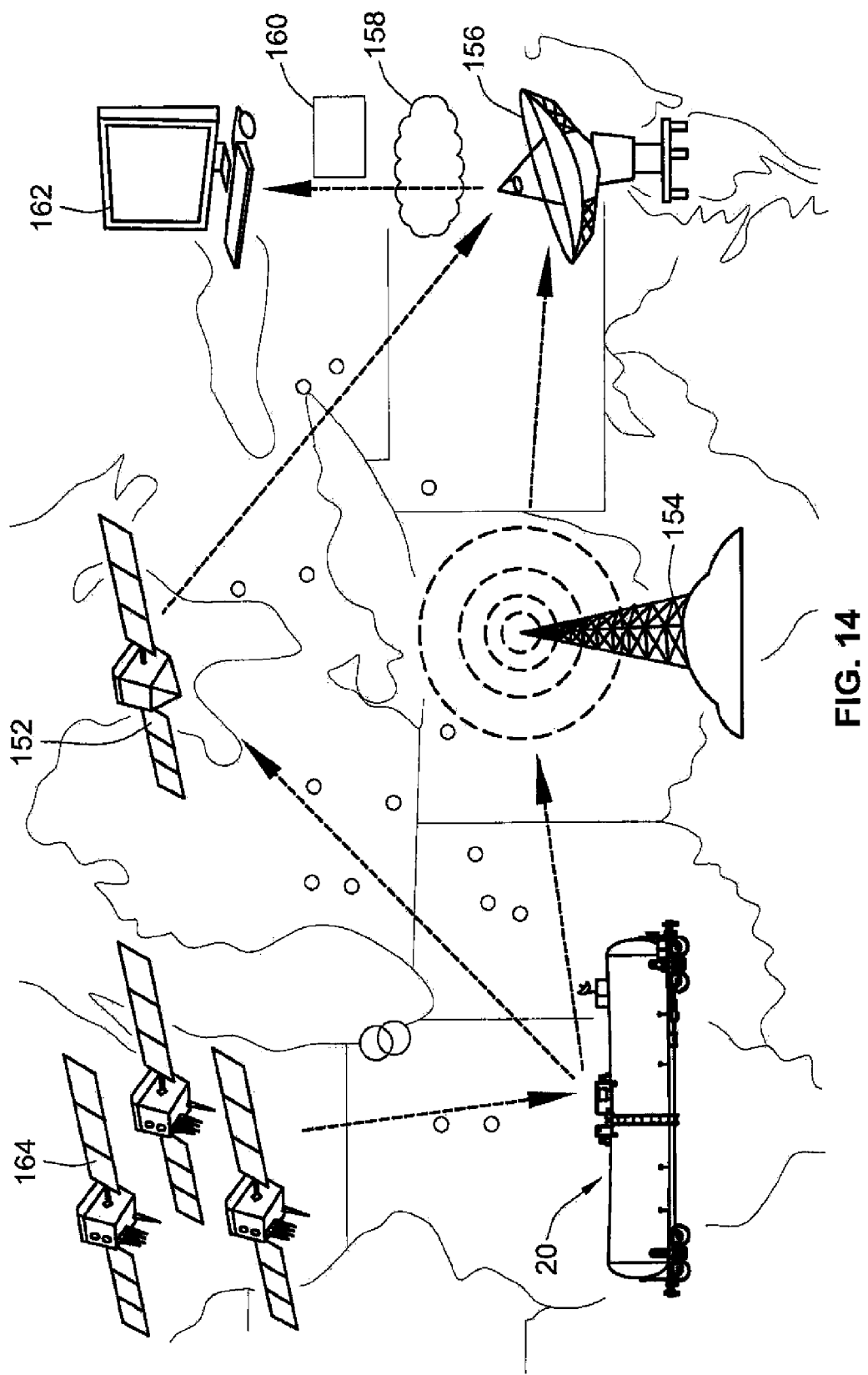
FIG. 14 is a flow diagram illustrating the data transmission and reception components in an embodiment of the system of the invention.

As illustrated in FIG. 14, the telemetry data from the tank car transceivers (136 and/or 142 in FIG. 13) may be transmitted to a geo-stationary communications satellite 152 and/or a cellular system 154 to one or more remote receiving station(s) 156. The receiving station transmits the data via the Internet 158 to a web based portal 160 which is accessible by a user via a workstation 162. Data collected and transmitted can be from a stationary or moving railcar. Location data may be generated by Global Positioning System (GPS) satellite technology 164.

As illustrated in FIG. 1, the railcar 20 may feature a number of additional transducers or sensors in addition to the weighing system load cells presented above with regard to FIGS. 1-13. As shown in FIG. 1, the transducers and sensors may include a temperature sensor 172, for measuring both the temperature inside and outside of the tank car, a pressure sensor 174 for measuring the pressure within the tank car, a proximity switch 176 for the manway cover (to determine if it is open or closed), accelerometer (to record longitudinal, lateral and vertical forces) and motion sensors 178, a vessel corrosion sensor 180, a vapor and leak detection sensor 182, a video, infrared and tampering sensor 184, a handbrake and motion sensor 186, a bearing condition sensor 188, a valve operation sensor 192 and stress detection sensors 194. As an example of use, the pressure sensor 174 and manway cover switch 176 of FIG. 1 may alert personnel if a chemical tank car hatch cover or valve is opened. They also alert personnel if a box car, auto rack car or food/grain hopper cars has been opened or breached.

Outputs from all of the transducers and sensors of the railcar of FIG. 1 may be combined together to electronically represent the status, health or condition of any railcar. Each of the load cell, transducer and sensor devices on the railcar must communicate with the railcar signal conditioning and converter components 194 and transceiver 196 for transmission in accordance with FIG. 14.

Getting the load cell, transducer and sensor data to the railcar signal conditioning and converter components 194 and transceiver 196 requires a communication means such as wire, fiber optic or wireless means. Some sensors require one of these methods for proper operation, but most sensors car be transmitted by any means. The most preferred method is wireless communication. This allows for ease of application, less labor and materials, is less conspicuous and eliminates the need to route and conceal cables/wires per AAR/FRA rail regulations. Suitable wireless technology is available from IONX LLC of West Chester, Pa. and makes the application of the load cells, transducers and sensors easier and cheaper. The wireless technology also provides superior communication from the sensors to the on-board conditioning and converter components and transceiver because each sensor is also a "smart" transceiver which when combined (networked) with other "smart" transceiver sensors, communicate (talk) to each other to identify and redirect the signal among the sensor network to provide the best transmission path to minimize interference, maximize signal strength and demand the least amount of power.

In an embodiment of the system, wireless sensors are set up in a wireless network with each sensor (node) having its own power source and transceiver. Nodes can communicate with other nodes and determine the best path of communication and minimize power requirements to reach the railcar conditioning and converter components and transceiver.

The railcar conditioning and converter components and transceiver 194 and 196 of FIG. 1 can be contained in a single housing that can also house generic sensors, such as ambient air temperature, humidity, acceleration, motion detection and other sensors not having location-specific requirements.

There could be times when the railcar is on track with a slight elevation. This scenario may lead to inaccurate measurement at the one end of the railcar because of the weight shift away or towards that measured end of the car. To compensate for this uneven condition and allow for the proper weigh to be expressed, an electronic inclinometer may be added to detect the degree of inclination and through an algorithm within the signal processor, correct the signal output to represent the calculated right of the railcar.

As noted previously, after sensor data is collected and conditioned, it sent to the transceiver 196 (FIG. 1), which allows communication via satellite, cellular or RFID (not illustrated in FIG. 14) to the receiving station 156 (FIG. 14). The transceiver may contain the receiver/CPU and a GPS transponder which interacts with the U.S. Federal location satellites. This feature gives location, altitude, speed and other features offered by conventional GPS capabilities. The GPS and sensor data is then transmitted via a modem in the specified form of transmission along with the remaining railcar telemetry data.

Once the condition or sensor data is received by the end user, the data can be further combined for additional value. In certain cases, the quality, value and safety of the shipped commodity, like chemicals in rail tank cars, is dependent on the way it is handled during shipment such as the rate of rise or fall of temperature or pressure and the magnitude of impact forces during rail movement.

The system may include redundancy sensors that ensure false positive reading do not occur. If a false positive were to happen, it may result in a team of safety or engineers to respond to an event in the middle of the country (at great expense) only to find the sensor was defective or not operating properly. An example of a redundancy sensor would be the hatch cover "open" sensor that detects tampering if the hatch cover is opened while the railcar is in transit. The hatch cover sensor available from by IONX LLC of West Chester, Pa., has a proximity switch that breaks the electrical contact when the hatch is opened, but it is also combined with an inclinometer sensor. If the proximity switch is opened (hatch open), but the inclinometer says there is no change in the inclination, there will be a false positive alarm generated, prompting failure investigation before spending time and money to respond.

A preferred method to add value to data generated by the system is by associating the location data (GPS) with information stored in the on-board memory of microprocessors in the on-board transceiver. In the case with chemical rail tank cars, the commodity description is loaded into the memory along with important HAZ MAT information and instruction to be used in the case of emergency or inspection. Several benefits are identified with this synergistic method.

In the case of an accident, this system can report to local, state and federal authorities, first responder HAZ MAT teams and shippers the exact location, chemicals involved and the chemical safety and emergency requirements for this type of accident. By instant knowledge and monitoring of temperature and pressure change, the system can also alert agencies and local responders the severity of the chemical leak or leak rate of the accident which will determine their containment plan.

The location data (GPS) can also provide authorities and shippers important national security information. It is known that the Department of Homeland Security (as demonstrated by their funding of the Freight Rail Security Program) is interested in the movement of TIH (Toxic Inhalation Hazards) chemicals such as Chlorine and Anhydrous Ammonium through HTUA (High Threat Urban Area) cities (there are approximately 62 HTUA cities in the US; such as Chicago, Houston, Washington, etc.). When chemical tank cars are identified by this system of carrying TIH material, they can be monitored by the DHS to determine if these TIH cars are in a HTUA city during times of interest or emergency. This system along with the GPS provider or other providers can create what are called Geo-Fences which is a virtual (overlaid on a map) coordinate grid established around the known HTUA cities. With such a system, the tank car information along with its GPS capability can cause an alarm when the TIH tank car enters, exits or passes through the virtual Geo-Fence established for these cities.

Another benefit of combining sensor data is to aid the monitoring by the security agencies (DHS, Fed, State) or shippers by identifying the condition or risk of the tank car transporting the TIH. During times of emergency, responders are aided by minimizing and simplifying their duties. A tank car that is identified as a TIH tank car but is empty poses little threat or risk and can be one less point of concentration or monitoring. By combining the car weighing system and the GPS data, the transmitted signal of an empty TIH car when placed on a map can produce, for example, a color green (empty) as opposed to a color red (loaded).

There is much attention given to transporting TIH chemicals on the rail and public safety and ability to address an accident to protect the public is very important. Again, by combining several of the components of the system with information available on the internet and other electronic environments, public safety risk can be reduced. If an accident were to occur and/or a spill is detected by the system, notifications can be sent to authorities, shippers and responders the exact location of the accident. The message or notification could pull up Google Maps to identify location and contact phone numbers of public facilities, state/local buildings, schools, local hospitals or other places where people reside. Current weather maps could be pulled up to identify wind speed and direction to identify propagation of toxic cloud movement.

Data received by sensors indicating the conditions in which railcars are handled and/or damaged is not only useful in identifying the where, how or who caused the damage, but real-time, in-service empirical data can be used by design engineers to redesign and potentially prevent damage in the future.

Sensors such as crack detectors, strain gages, corrosion severity detectors and impact accelerometers can be used to trigger alarms indicating the rail car is about to incur a critical failure and should be flagged and pulled out of service before an incident occurs.

Accelerometer sensors can provide data that can be calculated into impact force by using the F=MA formula since the mass of the railcar and acceleration are known. Impact force is very useful when identifying aggressive train car handling that causes damage. This excessive force not only can damage the commodity being transported, but is a major cost for the repair and upkeep of railcars which are highly regulated and must pass physical inspection to insure safe operation. Knowing where, when and how these large impact forces occur will not only help in the resolution of legal and financial issues, the data can be used prevent these excessive handling occurrences from happening in the future.

Once data is received by the end user (such as receiving station 156 or portal 160 in FIG. 14), it is loaded into a website or computer based software program capable of sorting, running calculations, manipulating and displaying data in formats that benefit the end user. The preferred software is provided by IONX LLC of West Chester Pa., who has developed the website which can display and run calculations to provide the needed information for the end user. Third party software can be further used to run calculations or assimilate into other data formats for other uses of the data. For instance, the Federal Railway Association (FRA) and railroad industry has a railcar information system called UMLER (Universal Machine Language Equipment Register). This system keeps track of all pertinent information about that particular railcar such as inspection interval, accident history, repair history, type of car and commodity, features and equipment on the cat and build date/manufacturer. Most all this data can be stored on an on-board microprocessor used by the system transceiver. This data can be sent directly to the UMLER data base eliminating the manual inputting of data and any delays or errors that may occur when done manually.

The collective data provided by this system, in particular, the car commodity weight, condition, date/time and location is of particular value to the shipper and customer of the commodity being transported. Typically these aforementioned parameters are generated by various systems (some being hand written or manual) and collected to make the sale and receipt of commodity inventory and transaction happen. With all these parameters provided in a single electronic format and signal, it can be streamed into a company's inventory management system or business system. The data from this system, containing product type, quantity, quality, location and date can drive inventory systems, invoicing, replenishment, order entry, performance histograms and other automated business systems to reduce cost, improve delivery, improve quality and reduce ship time.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for tracking and detecting a condition of a tank car containing a hazardous commodity comprising:
   a) a pressure sensor for measuring a pressure within the tank car;
   b) a proximity sensor adapted to be mounted on a lid of a manway cover of the tank car so as to detect when the lid of the manway cover has been opened;
   c) a microprocessor having a memory, said microprocessor and memory adapted to receive and store hazardous commodity emergency response data;
   d) a transceiver adapted to communicate with the pressure sensor the proximity sensor, and the microprocessor so as to receive condition data from the pressure sensor, the proximity sensor and the hazardous commodity emergency response data from the microprocessor memory said transceiver adapted to transmit the condition data and the hazardous commodity emergency response data to a receiving station remote from the tank car;
e) a first temperature sensor adapted to measure a temperature outside of a tank of the tank car; and
f) a second temperature sensor a second temperature sensor adapted to measure a temperature inside of the tank of the tank car.

2. The system of claim 1 further comprising a global positioning system transponder adapted to be positioned on the tank car.

3. The system of claim 1 further comprising an inclinometer adapted to be positioned on the tank car and wherein said transceiver is adapted to communicate with the inclinometer so that data from the proximity sensor and the inclinometer may be transmitted to a receiving station remote from the tank car.

4. The system of claim 1 further comprising an accelerometer adapted to be positioned on the tank car and wherein said transceiver is adapted to communicate with the accelerometer.

5. The system of claim 1 further comprising a motion sensor adapted to be positioned on the tank car and wherein said transceiver is adapted to communicate with the motion sensor.

6. The system of claim 1 further comprising a video sensor adapted to be positioned on the tank car and wherein said transceiver is adapted to communicate with the video sensor.

7. The system of claim 1 wherein the microprocessor and transceiver are adapted to be positioned on the tank car.

8. The system of claim 1 wherein the hazardous commodity emergency response data includes a description of the hazardous commodity and information and instructions for use during an emergency or inspection.

9. A tank car having a tracking and condition detection system for hazardous commodity loads comprising:
a) a body including a tank with a manway cover having a lid;
b) a pressure sensor for measuring a pressure within the tank car;
c) a proximity sensor mounted on the lid of the manway cover of the tank so as to detect when the lid of the manway cover has been opened;
d) a microprocessor having a memory, said microprocessor and memory adapted to receive and store hazardous commodity emergency response data for a load;
e) a transceiver in communication with the pressure sensor, the proximity sensor, and the microprocessor so as to receive condition data from the pressure sensor, the proximity sensor, and the hazardous commodity emergency response data from the microprocessor memory said transceiver adapted to transmit the condition data, the location data and the hazardous commodity emergency response data to a receiving station remote from the tank car;
f) a first temperature sensor adapted to measure a temperature outside of a tank of the tank car; and
g) a second temperature sensor adapted to measure a temperature inside of the tank of the tank car and wherein said transceiver is in communication with the first and second temperature sensors.

10. The tank car of claim 9 further comprising an inclinometer positioned on the tank car body and wherein said transceiver is in communication with the inclinometer so that data from the proximity sensor and the inclinometer may be transmitted to a receiving station remote from the tank car.

11. The tank car of claim 9 further comprising an accelerometer positioned on the tank car body wherein said transceiver is in communication with the accelerometer.

12. The tank car of claim 9 further comprising a motion sensor positioned on the tank car body wherein said transceiver is in communication with the motion sensor.

13. The tank car of claim 9 further comprising a video sensor positioned on the tank car body wherein said transceiver is in communication with the video sensor.

14. The tank car of claim 9 wherein the microprocessor and transceiver are positioned on the tank car body.

15. The tank car of claim 9 wherein the hazardous commodity emergency response data includes a description of the hazardous commodity and information and instructions for use during an emergency or inspection.

16. A method for remotely tracking and determining a condition of a tank car containing a hazardous commodity comprising the steps of:
a) detecting a leak in a tank of the tank car using a pressure sensor measuring the pressure with the tank of the tank car and a proximity sensor adapted to be mounted on a lid of a manway cover of the tank car so as to detect when the lid of the manway cover has been opened;
e) storing emergency response data for the hazardous commodity contained in the tank car in a computer memory;
f) providing data from the pressure sensor, the proximity sensor, and computer memory;
g) transmitting the data from a transceiver to the pressure sensor, the proximity sensor, and computer memory to a receiving station remote from the tank car.

17. The method of claim 16 wherein the emergency response data stored for the hazardous commodity includes a description of the hazardous commodity and information and instructions for use during an emergency or inspection.

18. The method of claim 16, wherein the computer memory and the transceiver are positioned on the tank car body.

19. A system for tracking and detecting a condition of a tank car containing a hazardous commodity comprising:
a) a pressure sensor for measuring a pressure within the tank car;
b) a proximity sensor adapted to be mounted on a lid of a manway cover of the tank car so as to detect when the lid of the manway cover has been opened;
c) a microprocessor having a memory, said microprocessor and memory adapted to receive and store hazardous commodity emergency response data;
d) a transceiver adapted to communicate with the pressure sensor the proximity sensor, and the microprocessor so as to receive condition data from the pressure sensor, the proximity sensor and the hazardous commodity emergency response data from the microprocessor memory, said transceiver adapted to transmit the condition data and the hazardous commodity emergency response data to a receiving station remote from the tank car; and
e) an inclinometer adapted to be positioned on the tank car and wherein said transceiver is adapted to communicate with the inclinometer so that data from the proximity sensor and the inclinometer may be transmitted to a receiving station remote from the tank car.

20. A tank car having a tracking and condition detection system for hazardous commodity loads comprising:
  a) a body including a tank with a manway cover having a lid;
  b) a pressure sensor for measuring a pressure within the tank car;
  c) a proximity sensor mounted on the lid of the manway cover of the tank so as to detect when the lid of the manway cover has been opened;
  d) a microprocessor having a memory, said microprocessor and memory adapted to receive and store hazardous commodity emergency response data for a load;
  e) a transceiver in communication with the pressure sensor, the proximity sensor, and the microprocessor so as to receive condition data from the pressure sensor, the proximity sensor, and the hazardous commodity emergency response data from the microprocessor memory, said transceiver adapted to transmit the condition data, the location data and the hazardous commodity emergency response data to a receiving station remote from the tank car; and
  f) an inclinometer positioned on the tank car body and wherein said transceiver is in communication with the inclinometer so that data from the proximity sensor and the inclinometer may be transmitted to a receiving station remote from the tank car.

* * * * *